No. 793,028. PATENTED JUNE 20, 1905.
G. F. CONNER.
FEEDING, SEPARATING, AND BAND CUTTING MECHANISM.
APPLICATION FILED JUNE 12, 1902.
4 SHEETS—SHEET 2.
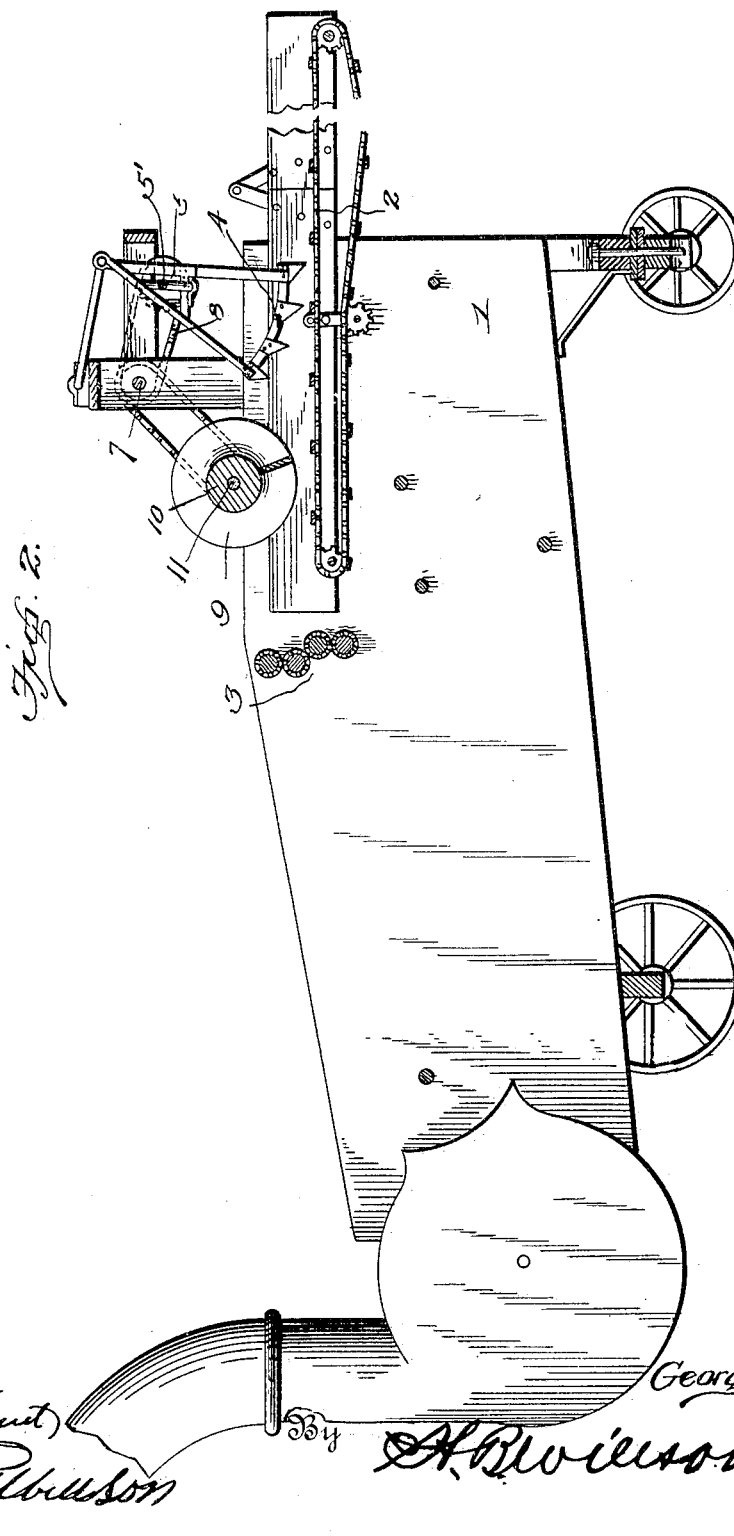
Witnesses
Inventor
George F. Conner
By
Attorneys No. 793,028. PATENTED JUNE 20, 1905.
G. F. CONNER.
FEEDING, SEPARATING, AND BAND CUTTING MECHANISM.
APPLICATION FILED JUNE 12, 1902.
4 SHEETS—SHEET 3.
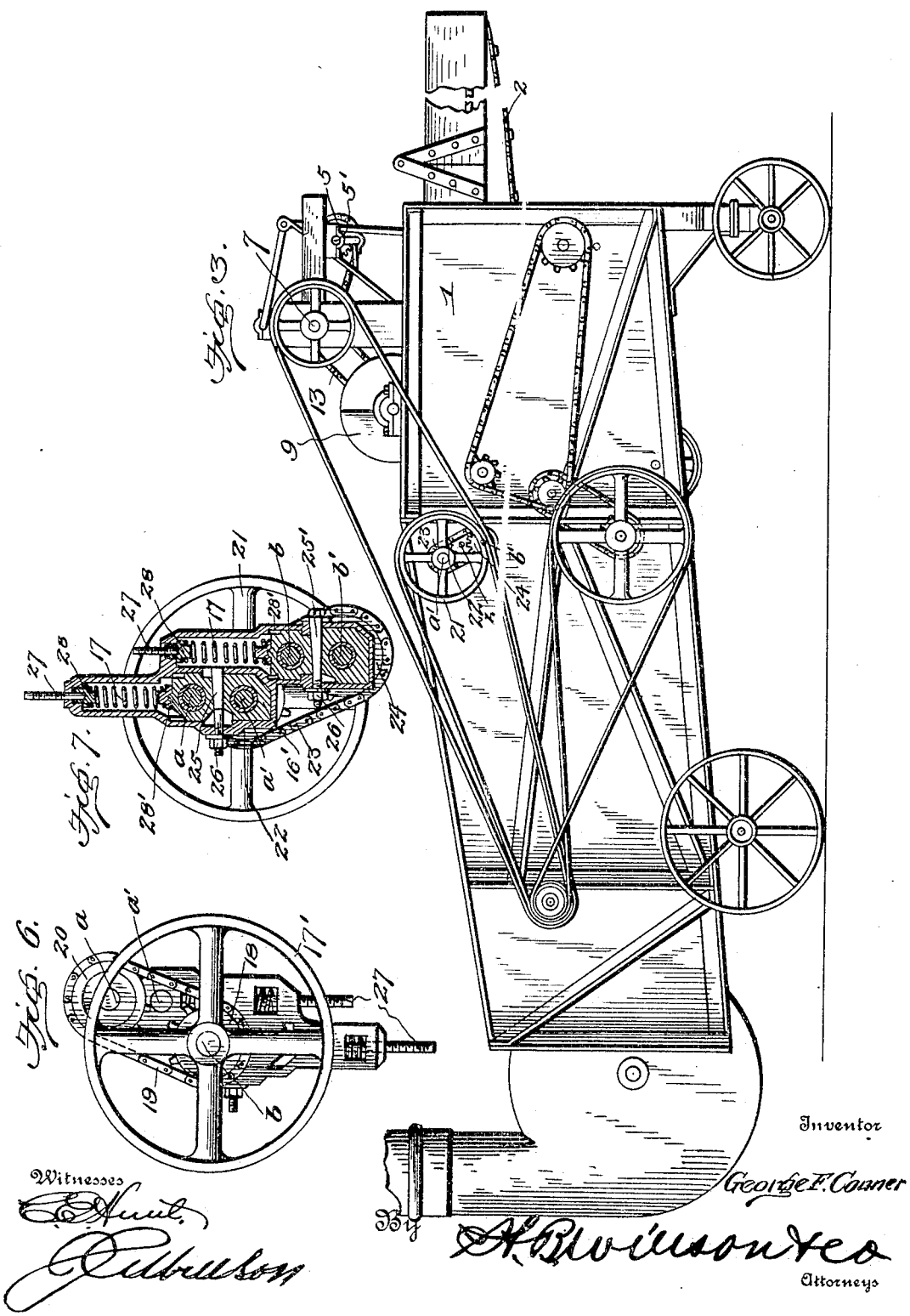

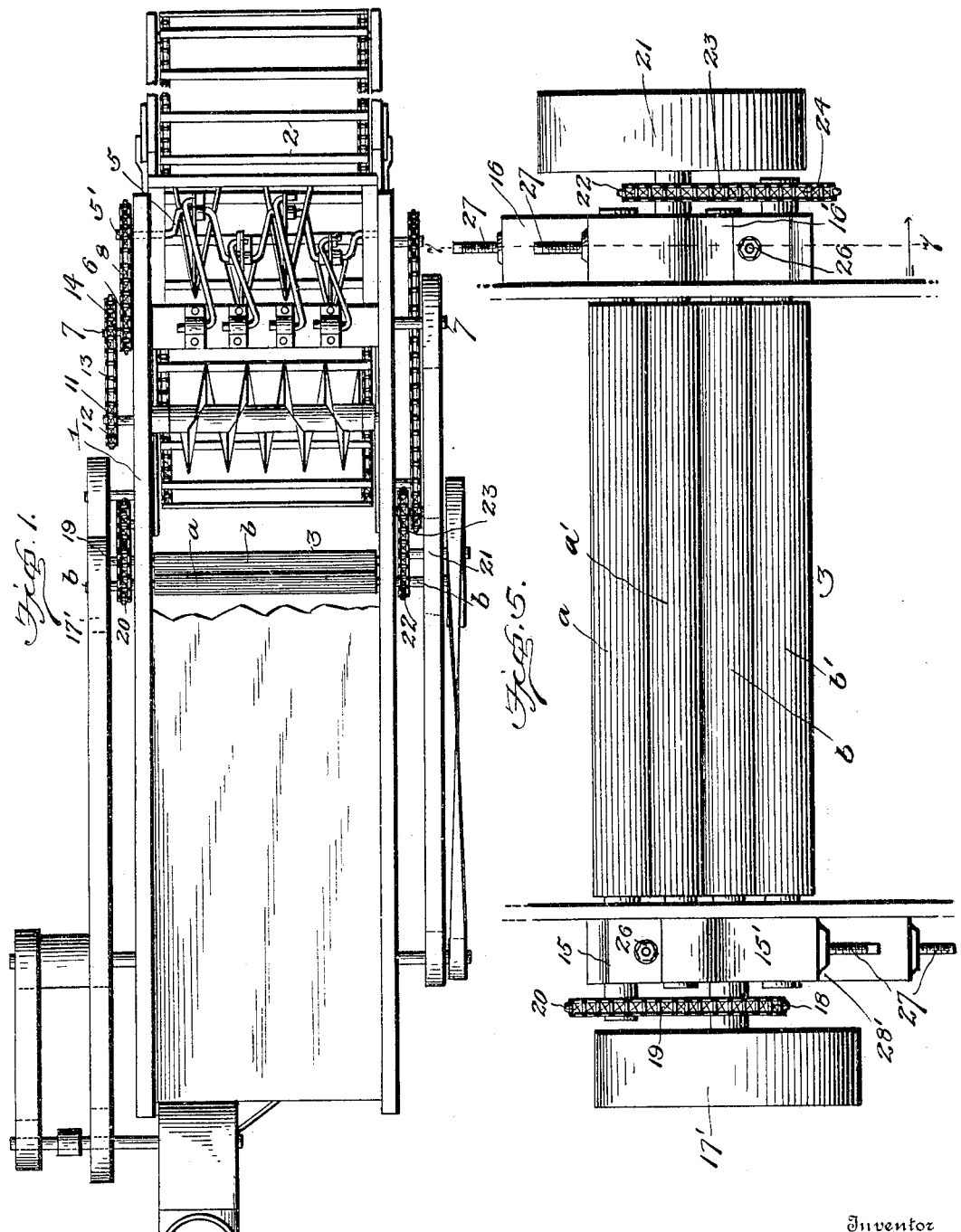

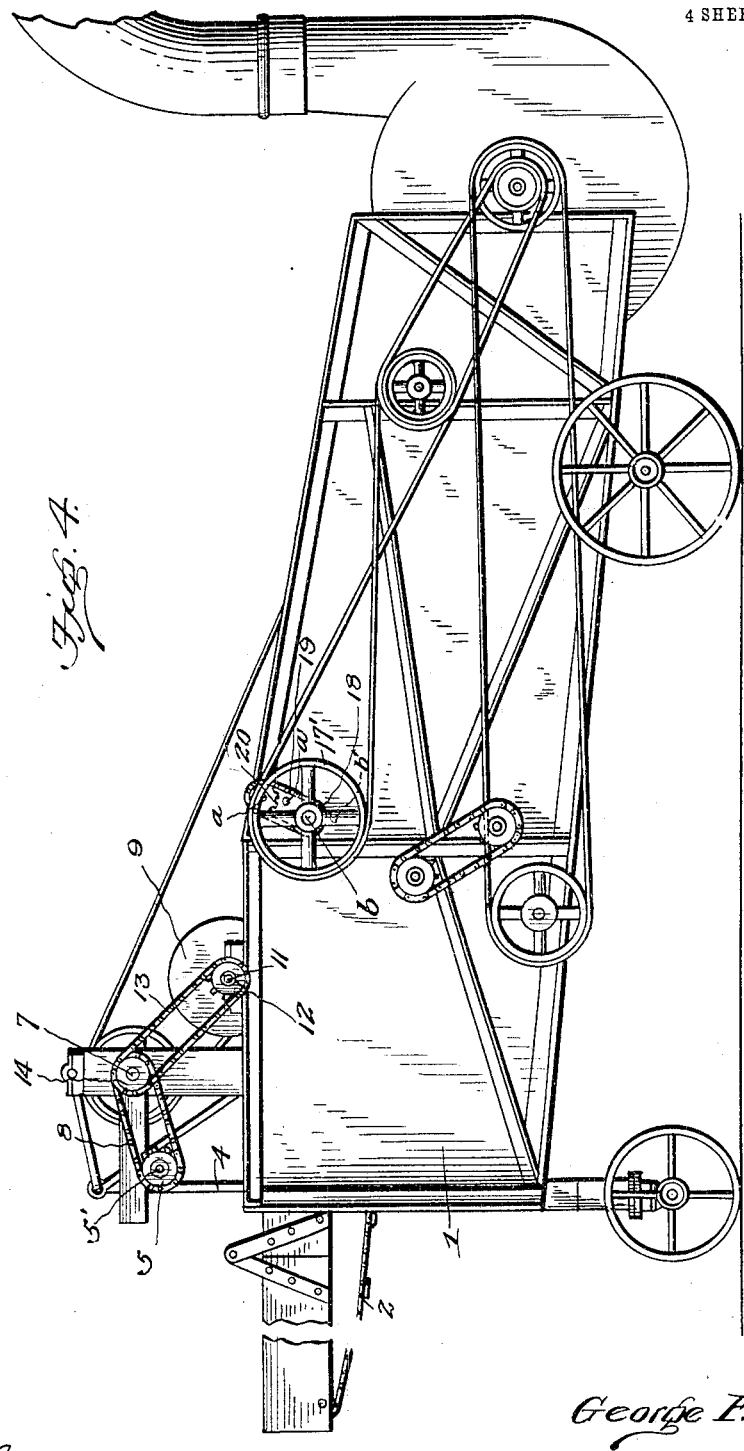

No. 793,028.

Patented June 20, 1905.

UNITED STATES PATENT OFFICE.

GEORGE F. CONNER, OF PORT HURON, MICHIGAN.

FEEDING, SEPARATING, AND BAND-CUTTING MECHANISM.

SPECIFICATION forming part of Letters Patent No. 793,028, dated June 20, 1905.

Original application filed February 17, 1902, Serial No. 94,558. Divided and this application filed June 12, 1902. Serial No. 111,326.

*To all whom it may concern:*

Be it known that I, GEORGE F. CONNER, a citizen of the United States, residing at Port Huron, in the county of St. Clair and State of Michigan, have invented certain new and useful Improvements in Feeding, Separating, and Band-Cutting Mechanism; and I do declare the following to be a full, clear, and exact description of the invention, such as will enable others skilled in the art to which it appertains to make and use the same.

This invention relates to improvements in feeding, separating, and band-cutting mechanism for combined corn huskers and shredders; and the present application is a division of my former application, filed February 17, 1902, Serial No. 94,558, on which Letters Patent of the United States No. 756,098 were granted March 29, 1904.

The object of the invention is to provide simple and effective means for severing the ears from the stalk, for feeding bundles to the severing devices, and for cutting the bands which bind the stalks into bundles and spreading out the stalks on their passage to the severing device, thus rendering the operation continuous and at the same time placing the stalks in the best possible position for the detachment of the ears.

A further object of the invention is to provide a severing device in the form of snapping-rolls so constructed and arranged as to prevent the crowding of the stalks and the crushing and shelling of the corn.

A still further object of the invention is to provide a band-cutter and spreader which will coöperate with the feeder to advance the stalks to the snapping-rolls and which will at the same time constantly shift the position of the individual stalks, so that any stalks lying at an angle to the line of feed will be automatically brought into feeding position, thus preventing any undue massing or retardation of the stalks.

With the above and other objects in view, which will readily appear as the nature of the invention is better understood, said invention consists in certain novel features of construction and combination and arrangement of parts, which will be hereinafter fully described and claimed, and illustrated in the accompanying drawings, in which—

Figure 1 is a top plan view of a corn husker and shredder embodying my invention, the frame appearing partly in skeleton section in order to clearly disclose the interior part. Fig. 2 is a vertical longitudinal section of the same. Fig. 3 is an elevation of one side of the machine. Fig. 4 is a similar view of the opposite side of the same. Fig. 5 is a detail front elevation of the snapping-rolls. Fig. 6 is an end elevation thereof. Fig. 7 is a section on the line 7 7 of Fig. 5.

Referring now more particularly to the drawings, the numeral 1 represents the frame of the machine, in which is mounted a feeder or endless conveyer 2, which carries the corn previously cut and bound into bundles in the usual manner to the separating devices 3, which pluck or separate the ears from the stalks. The said separating or ear-severing devices are here shown as a plurality of pairs of snapping-rolls out of alinement with each other and located in different horizontal planes and with their axes transverse to the line of action of the feeder and are fully described and claimed in the Letters Patent hereinbefore referred to. As each bundle of stalks is conveyed along by the carrier the bands thereof are cut by a series of band-cutting knives 4, which receive motion from a compound crank-shaft 5, suitably mounted upon the front portion of the frame. The crank-shaft 5 is provided at one end with a sprocket-wheel 5', which receives motion from the sprocket-wheel 6 on an auxiliary drive-shaft 7 through the medium of a connecting-chain 8.

The band-cutting mechanism is preferably of the construction shown in my prior application for patent, filed July 15, 1901, Serial No. 68,416, on which Letters Patent of the United States No. 701,846 were granted June 10, 1902, but may be of any approved type.

It is of material assistance and advantage that the band-cutting device be of a character that will not retard but aid the forward movement of the stalks toward the snapping means along the conveyer. To this end it is preferable to have the cutting-knives, as shown, travel in line with and in the same direction as the stalks, and thus aid in forcing the stalks to the snapping-rolls and to keep the stalks moving through the mass. After the stalks are loosened up by the cutting of the bands they are spread apart prior to their engagement by the snapping-rolls, so as to enable the stalks to be acted upon in a separated state and to prevent crowding and choking of the said separating devices in the passage of the stalks therethrough. The means for spreading the stalks consists of a revolving spreader 9, mounted above the endless conveyer 2 and between the band-cutters 4 and the separating devices or snapping-rolls 3. This spreader is composed of a drum on which is mounted a spiral screw, said screw being right and left hand spiraled from the center each way toward the opposite sides of the frame, thereby causing the stalks passing beneath the same to be forced apart and spread laterally, so as to lie in a regular and loosened state to adapt them to be conveniently acted upon by the snapping-rolls without the liability of the parts becoming choked or binding. A very important feature of the spreader is the fact that while it acts to separate or spread the stalks laterally it also aids conjointly with the conveyer and the band-cutter to move the stalks in a positive manner to the separating devices 3. Furthermore, it compresses the stalk within a horizontal plane which bounds the range of action of the snapping-rolls, as hereinafter described, so that there will be no stalk-butts projecting above the general mass to ride over the snapping-rolls. The action of the band-cutter knives and the spreader-flanges agitating the stalks causes the latter to be spread out and materially aids the snapping-rolls or separating devices in the performance of their work.

The drum 10, which carries the spiral screw or disk, is mounted on a shaft 11, which carries at one end a sprocket wheel or pinion 12, which receives motion through the medium of a chain 13 from the sprocket wheel or pinion 14 on the auxiliary driving-shaft 7.

The snapping-rolls 3 consist of a battery of two sets or pairs of vertically-arranged snapping-rolls $a$ $a'$ and $b$ $b'$, extending transversely of the frame at the inner or rear end of the conveyer 2, the lower set or pair of snapping-rolls $b$ $b'$ being arranged below and a little in advance of the set $a$ $a'$ or a little nearer to the conveyer 2. One end of each roll is journaled in a stationary box, while the opposite end is journaled in an automatically-adjustable box held in place by means of a coil-spring. As shown in Figs. 5, 6, and 7, the roll $a$ is mounted at one end in a stationary box or bearing 15 and its opposite end in a movable box or bearing 16, the adjustable bearing 15' being arranged beneath the stationary bearing 15 of the roll $a$ and the rigid bearing 16' beneath the adjustable or movable bearing 16, so that the adjustable or movable bearing of one roll comes below or above the rigid bearing of the other roll. The roll $b$ is mounted similar to the roll $a$, while the roll $b'$ is mounted similar to the roll $a'$. Each roll thus has one end rigidly mounted and the other end movably mounted, and the automatically-adjustable boxes 15' and 16, which carry the movable ends of the rolls, are held in place by means of a coil-spring 17. It will thus be seen that when the cornstalks enter between these rolls they are free to spring apart by compression of the coil-springs and that one end of each roll is adapted to yield or give while the opposite end remains stationary. The object of having a stationary end to each roll is to provide suitable means for the proper driving of each of the four rolls. The driving of the rolls is accomplished as follows: One end of the roll $b$ has an extended shaft on which is keyed a band-wheel 17' and a sprocket-wheel 18, from which sprocket-wheel extends a chain 19, which passes around a similar sprocket 20, keyed upon an extended end of the roll $a$. The roll $a'$ is provided with an extended shaft on which is keyed a band-pulley 21 and a sprocket-wheel 22, from which sprocket-wheel extends a chain 23, which passes around a sprocket-wheel 24 on the contiguous extended end of the roll $b'$. By this construction and arrangement of the driving mechanism it will be seen that the rolls $a$ and $b$ are connected by gearing at one side and the rolls $a'$ and $b'$ by gearing at the opposite side, such gearing connecting between the rigidly-mounted ends of the rolls, so that all four of the rolls will be simultaneously driven and will have the same speed, thus forming two pairs or sets of rolls, the rolls of each pair coacting to sever the ears from the stalks passing therethrough, while all receive motion at the same speed from a common source of power. In order to adjust the rolls the proper distance apart and prevent them from bearing too hard against each other, wedge-shaped keys 25 and 25' are provided, which are inserted between each pair of flexible and stationary boxes and are held in position by nuts 26, applied to the ends thereof, said keys by being placed between the boxes serving as supports for each end of the rolls. The tension of the coil-springs 17 may be increased or diminished by means of set-screws 27 bearing against followers 28, which bear against the outer end of said springs and hold them properly positioned. The boxes, keys, and springs are mounted in suitable bearings or supports 28', attached to the frame of the machine.

The purpose of employing a plurality of sets of snapping-rolls and arranging the rolls in the manner shown and described is to obviate certain objections to the corn husking and shredding machines now in common use. In such machines it has been customary to employ but a single pair of snapping-rolls, and as such rolls must of necessity be of limited diameter their lengths were limited by their strength to resist the strains put upon them, so that the working capacity of the rolls was less than the feeding capacity of the feeder—*i. e.*, when a large bundle was placed upon the feeder a greater amount of corn was fed to the rolls than the latter could take care of, resulting in the gorging of the throat of the machine, which if not relieved was liable to cause damage. This gorging or crowding of the stalks was also destructive in causing the crushing and shelling of a large portion of the small ears of corn. Consequently close attention was required in order to keep the machine at work and reduce the amount of damage to the material, and it has not infrequently happened that an operator in attempting to remove the gorge has lost a hand or an arm by the same being caught in the snapping-rolls or adjacent parts of the machinery. Furthermore, the crowding or gorging of the machine caused the snapping-rolls to be spread so far apart that the smaller ears would often pass through with the stalks and be cut up by the shredder, resulting in their complete loss, except as a part of the shredded fodder. Again, it was not feasible heretofore to employ a mechanical band-cutter, for the reason that it was impracticable to allow an entire bundle to pass to the roll at one time, it being necessary to cut the bands by hand and divide up the bundle, allowing only a part of each bundle to enter the snapping-rolls at a time. I overcome these several difficulties by using a battery or series of sets or pairs of rolls and so combining, proportioning, and arranging them relative to each other and to the feeder and so adapting the band-cutter and spreader to act upon the stalks and coact with said feeder in conveying the stalks to the rolls that the corn as fast as fed up is taken care of and an entire bundle may be fed to the rolls without liability of gorging the machine and with less injury to or loss of the ears of corn. I am thereby enabled to employ mechanical means to cut the bands and obviate the necessity of manually dividing up the bundles and maintaining a constant watch on the feeder and snapping-rolls—a very important result. It will be noted that the sets or pairs of rolls are located in different vertical planes one below the other and closer to and practically in line with the feeder, the latter serving thus to simultaneously convey the material to both rolls. This is the preferred arrangement; but of course the arrangement may be varied so long as the pairs or sets of rolls are so related as to be supplied with material by the feeder and are so combined that one assists in coacting with or feeding the next adjacent set or so that the feeder and band-cutting and spreading means coact therewith to secure an effective mechanical feeding of the stalks to the snapping-rolls.

It will be observed that the action of the band-cutter and separator upon the stalks of the bundle being fed up to the snapping-rolls is to loosen up and spread out such stalks, thus entirely avoiding the liability of the rolls becoming choked up by massed portions of the stalks and ears crushed or injured on account of improper feeding. It will be apparent that the endless conveyer acting alone as a feeder would be insufficient to secure an effective action, as a number of conditions must be reckoned with. First, the fact that when the stalks are wet and frozen they are separated with difficulty and some force must be exerted to feed them to and through the rolls. Again, stalks of unusually large size must be fed up with sufficient resistance against back-slipping to cause them to enter the rolls and to be flattened to allow the rolls a secure grip, and while such stalks are being acted on the smaller stalks must be kept in motion by some means auxiliary to the rolls to prevent the massing of the stalks, as owing to the degree to which the rolls must be spread apart to receive the large stalks the rolls themselves cannot grip and feed the small stalks. At times, too, a stalk displaced by being broken is turned out of the line of feed and will lie at an angle to the line of feed and will cause crowding of the other feeding stalks unless the stalks, in addition to being advanced to the rolls by a positive force feed, are agitated to shift them and then bring the displaced stalks into line. All these and other conditions are effectually met by the construction, relation, and coacting operations of the feeder, band-cutter and spreader, which not only cut the binding-band and spread out the stalks evenly over the surface of the feeder, but hold down the stalks to prevent them from slipping backward and confine them within the range of action of the rolls, force the stalks from and with the conveyer, and, withal, keep the stalks in constant agitation, turning them over and over, so that if there be any displaced stalks in the mass the same will be brought into proper position to feed through the rolls. I have adapted the band-cutter and spreader to these ends, and in this respect the action of these elements is unique and each element given an additional function, and a combinative coaction is obtained whereby the feeder and snapping-rolls are adapted to coöperate efficiently under practically all conditions of service. It will be seen, therefore, that the stalks will be at all times kept moving forward in a direct line through the machine.

Having thus fully described my invention, what I claim as new, and desire to secure by Letters Patent, is—

1. The combination of snapping-rolls, a carrier to feed bundles of corn thereto, spaced therefrom, to permit the severed ears to drop, means coacting with the carrier to cut the bands and to positively feed the corn to the rolls, and a spreader disposed between the cutter and the rolls.

2. The combination of snapping-rolls, a carrier to feed bundles of corn thereto, spaced therefrom, to permit the severed ears to drop, means coacting with the carrier to cut the bands and to positively feed the corn to the rolls, and a spreader coacting with the carrier and the band-severing means to positively feed the corn to the rolls, said spreader being disposed between the cutter and the rolls.

3. The combination of a plurality of pairs of snapping-rolls mounted in different vertical planes, one pair of rolls above and out of alinement with another pair, a carrier to feed bundles of corn to the rolls, spaced therefrom, to permit the severed ears to drop, means coacting with the carrier to cut the bands and to positively feed the corn to the rolls, and a spreader disposed between the cutter and the rolls.

4. The combination of means for severing ears from cornstalks, a carrier to feed bundles of corn thereto, spaced therefrom, to permit the severed ears to drop, means to cut the bands and coacting with the carrier to positively feed the corn to the ear-severing means, and a spreader disposed between the band-cutter and the ear-severing means.

5. The combination of means for severing ears from cornstalks, a carrier to feed bundles of corn thereto, spaced therefrom, to permit the severed ears to drop, means to cut the bands, and a spreader between the band-cutter and the ear-severing means, said band-cutter and said spreader coacting with the carrier to positively feed the corn to the ear-severing means.

6. In a machine of the character described, the combination with two sets of snapping-rolls, a conveyer for advancing the stalks longitudinally against the rolls, a band-cutter whose blades engage and move in the direction of travel of the stalk, and a spreader adapted to act both laterally and longitudinally on the stalks and to confine the stalk-butts within range of action of the rolls, substantially as described.

In testimony whereof I have hereunto set my hand in presence of two subscribing witnesses.

GEORGE F. CONNER.

Witnesses:
D. E. PURDY,
H. E. HALL.